UNITED STATES PATENT OFFICE.

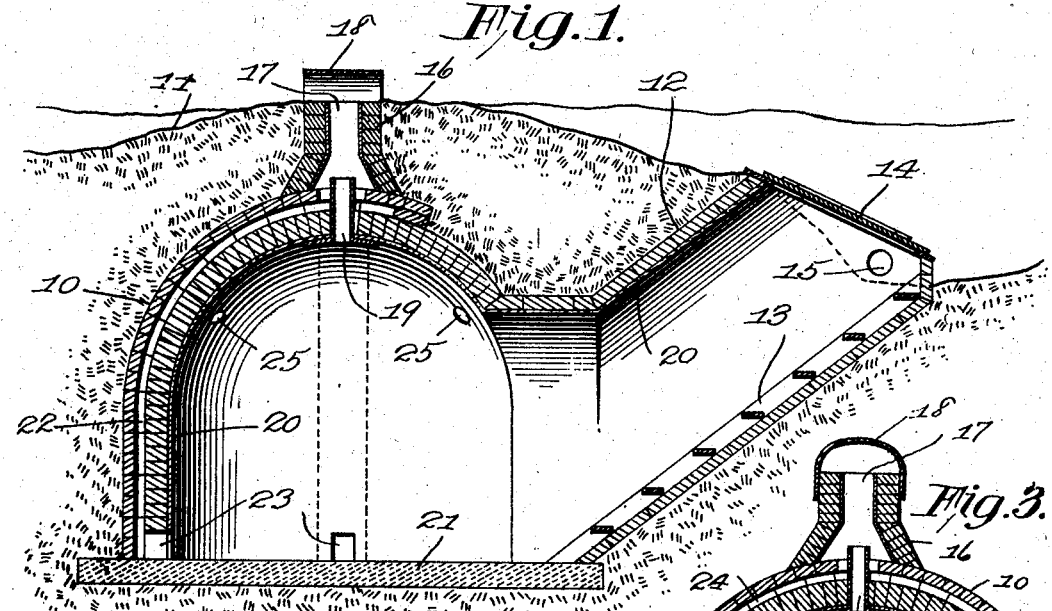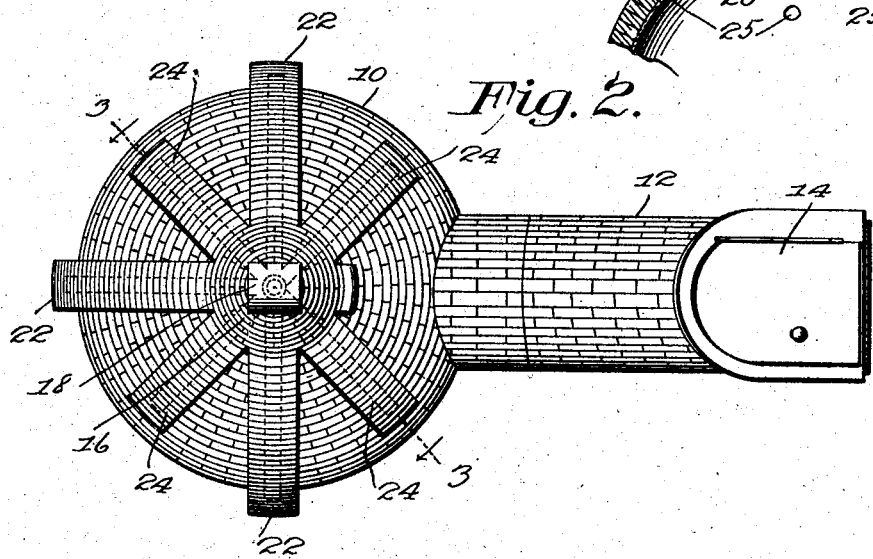

CYRUS A. JULIAN, OF MARSE BLUFFS, NEBRASKA.

FRUIT AND VEGETABLE CAVE.

No. 795,984.	Specification of Letters Patent.	Patented Aug. 1, 1905.

Application filed April 20, 1905. Serial No. 256,581.

*To all whom it may concern:*

Be it known that I, CYRUS A. JULIAN, a citizen of the United States, residing at Marse Bluffs, in the county of Saunders and State of Nebraska, have invented a new and useful Fruit and Vegetable Cave, of which the following is a specification.

This invention relates to improvements in subterranean chambers or cellars employed for preserving fruit, vegetables, milk, butter, and other farm products and for similar purposes, and has for its object to produce a device of this character of improved construction and increased efficiency and utility.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a longitudinal sectional elevation of the improved apparatus. Fig. 2 is a plan view of the same. Fig. 3 is a sectional detail on the line 3 3 of Fig. 2.

The improved device comprises an inclosed compartment 10, preferably of brick or similar material and of any desired size or shape, but preferably circular and arched at the top and disposed beneath the ground, as indicated at 11. The compartment 10 is provided with a passage 12, leading downwardly thereinto, and provided with steps 13 and a hinged door 14 and also with a transverse aperture 15 near the door 14 and above the ground.

Rising from the compartment 10 is a chamber 16, having a discharge 17, covered by a hood or cap 18, the cap and the door 14, together with a small portion of the side wall of the passage 12, being the only parts above the ground. A ventilator-tube 19 leads from the compartment 10 into the chamber 16, as shown.

The walls of the compartment 10, chamber 16, and passage 12 are of sufficient strength and thickness to withstand the pressure of the earth and will be lined with suitable moisture-resisting material, such as Portland cement or the like and indicated at 20, and a cement bottom will be provided for the compartment, as indicated at 21.

Disposed exteriorly of the compartment 10 are a plurality of conductor-passages 22, connected at the lower ends, as at 23, with the interior of the compartment at the bottom, as at 24, and terminating at the upper ends in the chamber 16, and similar conductor-passages 24, opening at their lower ends, as at 25, into the compartment near the top and leading at the upper ends into the chamber 16. The passages 22 and 24 serve as ventilators through which currents of air freely pass, as hereinafter described, and preferably of brick and built in with the compartment when the latter is constructed. Any required number of the ventilator-passages may be employed; but they will generally be arranged as shown with the shorter passages alternating with the longer passages and spaced at uniform distances apart. By this simple arrangement it will be obvious that a free and rapid circulation of the air is provided for, so that a continuous change of the air is insured, whereby all foul odors are carried off and the requisite dryness and purity of the air is maintained.

The apparatus is simple in construction, can be inexpensively manufactured, and will be found very useful for the storage and preservation of farm products and for similar purposes.

Having thus described the invention, what is claimed is—

1. In an apparatus of the class described, an inclosed compartment having a passage leading thereinto, a closure to said passage, a ventilator leading from the upper part of said compartment, a ventilator leading from the bottom of said compartment and terminating near the top of the same, and a ventilator leading from said compartment intermediately of its height and terminating near the top of same.

2. In an apparatus of the class described, an inclosed compartment having a passage leading thereinto, a closure to said passage, a ventilator leading from the upper part of said compartment, a chamber inclosing said ventilator and extending above the same and provided with a discharge-aperture, and one or more ventilator-passages between the lower part of said compartment and said chamber.

3. In an apparatus of the class described, an inclosed compartment having a passage leading thereinto, a closure to said passage, a ventilator leading from the upper part of said compartment, a chamber inclosing said ventilator and extending above the same and provided with a discharge-aperture, one or more ventilator-passages between the lower part of said compartment and said chamber, and one or more ventilator-passages between the intermediate portion of said compartment and said chamber.

4. In an apparatus of the class described, a compartment formed of brick or like material and lined with a moisture-resisting coating and adapted for embedding beneath the ground, a passage leading downwardly into said compartment and provided with a detachable closure, a chamber extending above said compartment and provided with an aperture opening above the ground, a ventilator leading from said compartment and terminating in said chamber, a plurality of ventilator-passages connecting the lower portion of said compartment with said chamber, and a plurality of ventilator-passages connecting the intermediate portion of said compartment with said chamber.

In testimony that I claim the foregoing as my own I have hereto affixed my signature in the presence of two witnesses.

CYRUS A. JULIAN.

Witnesses:
H. D. MACKPRANG,
C. M. SKINNER.